(No Model.)

M. DILLENBURG.
COUPLING.

No. 587,546. Patented Aug. 3, 1897.

Witnesses:
O. L. Reinke,
Erwin J. Lotz,

Inventor
Mathias Dillenburg
by Rudolph M. Lotz, Atty

UNITED STATES PATENT OFFICE.

MATHIAS DILLENBURG, OF CHICAGO, ILLINOIS.

COUPLING.

SPECIFICATION forming part of Letters Patent No. 587,546, dated August 3, 1897.

Application filed April 3, 1897. Serial No. 630,544. (No model.)

*To all whom it may concern:*

Be it known that I, MATHIAS DILLENBURG, a citizen of the United States, residing at Chicago, in the county of Cook and State of Illinois, have invented certain new and useful Improvements in Couplings; and I do hereby declare the following to be a full, clear, and exact description of the invention, such as will enable others skilled in the art to which it appertains to make and use the same.

My invention relates to a novel construction in a coupling adapted especially for repair-work on closet-bowls, the object being to provide a device of this kind in which part of the original coupling can be used and which can be employed to couple the flush-pipe to a closet-bowl of any construction; and it consists in the features of construction and combinations of parts hereinafter fully described and claimed.

Figure 1:
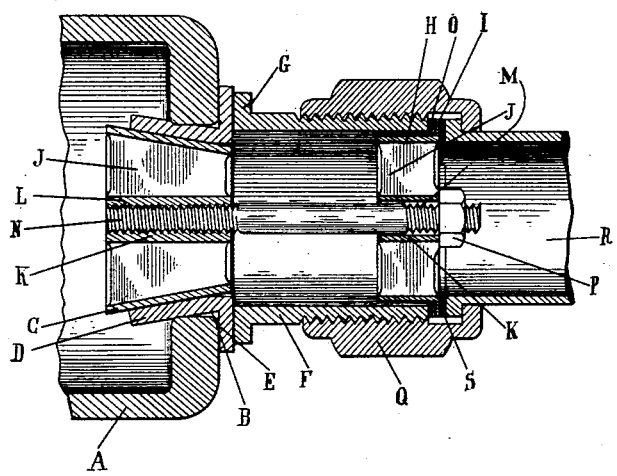
Figure 2:
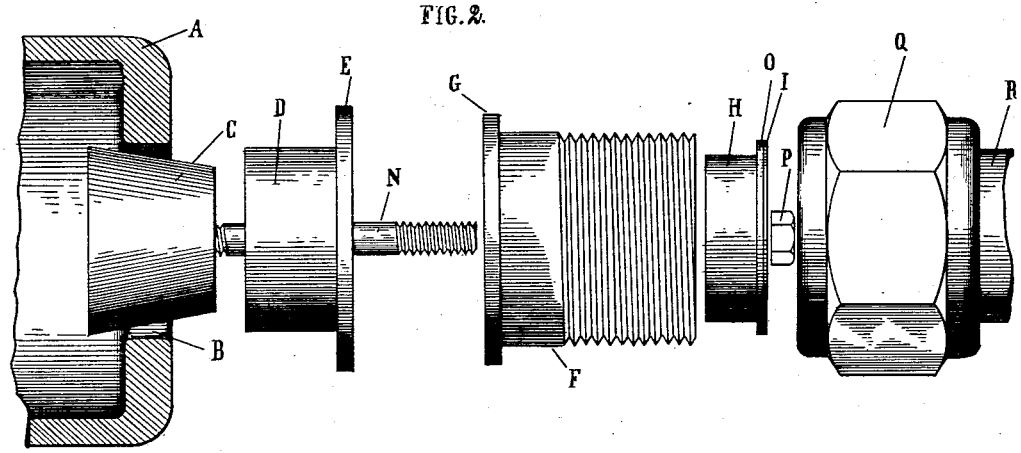

In the accompanying drawings, illustrating my invention, Figure 1 is a sectional view of my coupling when applied to couple the flush-pipe to the water-inlet of the bowl. Fig. 2 is a view in elevation of the various parts composing my coupling in the order in which they are applied and showing the water-inlet of the bowl of a closet in section.

Heretofore, as far as I am informed, couplings of this character have always been provided with lugs which engaged the inner wall around the inlet-opening of the bowl. Frequently said wall is not sufficiently wide to afford sufficient hold for the lugs, which consequently slipped out and caused great inconvenience. My invention is designed to overcome these defects.

Referring now to said drawings, A indicates the water-inlet of the bowl of a closet which is provided with a circular opening B.

My coupling consists of a hollow cone C, whose base is of a size slightly less than said circular opening B, so that it can be inserted therein; a rubber sleeve D, provided with a flange E, which is adapted to be inserted through said opening B and to receive said cone C; a screw-threaded pipe-section F, which is a part of the original coupling of ordinary construction, provided with a flange G, which is adapted to engage the flange E of said rubber sleeve D, and a sleeve H, adapted to fit within said pipe-section F and provided with a circumferential flange I, adapted to engage the outer end of said pipe-section F. Said cone C and sleeve H are provided with diametric ribs J, which are enlarged at their centers, as at K, and provided with openings L and M, respectively, said opening L being screw-threaded to engage the screw-threaded inner end of the shank N, and said opening M being smooth to permit the passage of the outer screw-threaded end of the shank N therethrough. A rubber washer O is inserted between said flange I of the sleeve H and the outer end of said pipe-section F to make a water-tight joint. As before stated, said cone C is first inserted through the opening B, and the rubber sleeve D is then inserted until the flange E rests against the outer wall around said opening B. Said cone C is then drawn into the said sleeve D, thus spreading the latter and compressing it against the inner wall of said opening. The pipe-section F is then placed in position and the sleeve H inserted therein, so that the opening M passes over the outer end of the shank N. The nut P is then placed upon the projecting end of said shank N until it engages the enlarged portions K and is tightened, thus obviously pressing the flange G of the pipe-section F hard upon the flange E of the sleeve D and compressing the latter between the cone C and the inner wall of the opening B, thus forming water-tight joints between all of said parts. Said pipe-section F is exteriorly screw-threaded to engage the union Q, by means of which the end of the flush-pipe R is connected therewith, a rubber washer S being interposed between the flange I of the sleeve H and the end of said flush-pipe, for obvious reasons.

A coupling constructed in accordance with my invention is obviously very easily applied and is strong, durable, and efficient.

It will be obvious that by employing a part of the old coupling, which is screw-threaded and must, therefore, fit the union, I save a great deal of labor and annoyance, for the reason that the screw-threads on different unions differ so widely that the sections F, having numerous different screw-threads, would have to be tried before one could be found to fit.

My device can also be used to couple the ventilating-pipe to the closet-bowl and for numerous other purposes.

I claim as my invention—

1. A coupling comprising a hollow cone provided with a shank adapted to be inserted into an opening, a rubber sleeve adapted to fit said opening and to receive said hollow cone, a flange on said sleeve, a pipe-section provided with a flange adapted to engage said flange on said sleeve, a sleeve adapted to fit within the other end of said pipe-section and provided with a flange adapted to engage the outer end of said pipe-section and with a concentric sleeve supported by a diametric rib adapted to receive said shank of said cone, a nut adapted to engage the outer projecting end of said shank and said outermost sleeve, whereby said cone and said pipe-section are caused to compress said rubber sleeve to form water-tight joints, and a union for coupling said pipe-section to a flush-pipe, substantially as described.

2. In a coupling, the combination with the inlet end of a closet-bowl having an opening, a hollow cone adapted to be inserted in said opening, a shank on said cone, a pipe-section, and a sleeve adapted to fit within and engage the outer end of said pipe-section and to receive the outer end of said shank and be engaged by a nut thereon, of a rubber sleeve adapted to fit within said opening and to receive said cone and be compressed between the same and the inner wall of said opening, and provided with a flange adapted to be compressed between the inner end of said pipe-section and the outer wall of said bowl around said opening, substantially as described.

In testimony whereof I affix my signature in presence of two witnesses.

MATHIAS DILLENBURG.

Witnesses:
RUDOLPH WM. LOTZ,
ERWIN J. LOTZ.